US012705038B2

United States Patent
(12)
Viswanathan et al.

(10) Patent No.: US 12,705,038 B2
(45) Date of Patent: Aug. 11, 2026

(54) CODE PACKAGING FOR FLEXIBLE DEPLOYMENT WITHIN A MULTI-TENANT SYSTEM

(71) Applicant: Salesforce, Inc., San Francisco, CA (US)

(72) Inventors: Vivek Viswanathan, Clovis, CA (US); Christopher James Wall, Denver, CO (US); Dileep Burki, San Francisco, CA (US); Joseph Wegner, Chicago, IL (US); Mars Hall, San Francisco, CA (US); Natasha Gupta, Denver, CO (US)

(73) Assignee: Salesforce, Inc., San Francisco, CA (US)

( * ) Notice: Subject to any disclaimer, the term of this patent is extended or adjusted under 35 U.S.C. 154(b) by 620 days.

(21) Appl. No.: 18/104,227

(22) Filed: Jan. 31, 2023

(65) Prior Publication Data

US 2024/0256244 A1 Aug. 1, 2024

(51) Int. Cl.
*G06F 8/61* (2018.01)

(52) U.S. Cl.
CPC .................................... *G06F 8/61* (2013.01)

(58) Field of Classification Search
CPC ........................................................ G06F 8/61
See application file for complete search history.

(56) References Cited

U.S. PATENT DOCUMENTS 8,949,939 B2 * 2/2015 Peddada .............. H04L 63/105 726/4
9,176,720 B1 * 11/2015 Day-Richter ............ G06F 8/63
9,330,254 B1 * 5/2016 Xue ...................... G06F 21/554
2004/0015961 A1 * 1/2004 Chefalas ............ G06F 16/9535 709/221
2009/0144700 A1 * 6/2009 Huff .................... G06F 9/44505 717/121
2012/0066755 A1 * 3/2012 Peddada .............. H04L 63/102 726/8
2015/0200948 A1 * 7/2015 Cairns ..................... G06F 21/44 726/4
2015/0229628 A1 * 8/2015 Kosim-Satyaputra ...................... G06F 21/121 726/4
2018/0159856 A1 * 6/2018 Gujarathi ............ H04L 63/0281
2023/0289162 A1 * 9/2023 Brooks ................. G06F 16/214
2024/0256244 A1 * 8/2024 Viswanathan ........... G06F 8/61

OTHER PUBLICATIONS

International Search Report and Written Opinion for PCT/US2023/077009, dated Mar. 6, 2024, 13 pgs.
First Office Action for JP2025-542165, issued Feb. 10, 2026, 5 pgs.

* cited by examiner

*Primary Examiner* — Lewis A Bullock, Jr.
*Assistant Examiner* — Theodore E Hebert
(74) *Attorney, Agent, or Firm* — Kwan & Olynick LLP

(57) ABSTRACT

A multi-cloud system permits installation of software by an independent software vendor (ISV) in different manners, such as within a user space of an organization tenant of the multi-cloud system, a space of the ISV within the multi-cloud system, or a space of the multi-cloud system itself. Packaging and installation functionality of the multi-cloud system performs necessary configurations so that an ISV can simply specify how its code is to be made available to users via the multi-cloud system, without itself needing to create different configurations depending on the desired manner of usage.

18 Claims, 7 Drawing Sheets

CODE PACKAGING FOR FLEXIBLE DEPLOYMENT WITHIN A MULTI-TENANT SYSTEM

FIELD OF ART

This disclosure relates generally to multi-cloud multi-tenant computing systems, and more particularly to code packaging and deployment within such multi-cloud systems.

BACKGROUND

A multi-cloud system (also referred to as a multi-tenant system (hereinafter MTS)), in which different organizations register with the MTS to obtain their own accounts for using the MTS, provides a host of benefits, such as flexibility and scalability of computation, to its users. However, an MTS architecture is more complex than a traditional single-tenant system and offers more options, and hence the installation of new software within an MTS is similarly more complex than installation on a single-tenant system. Accordingly, it can be a significant burden on third-party independent software vendors (ISVs) who create software to configure their software to properly work on the MTS in the desired one of different possible manners.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1:
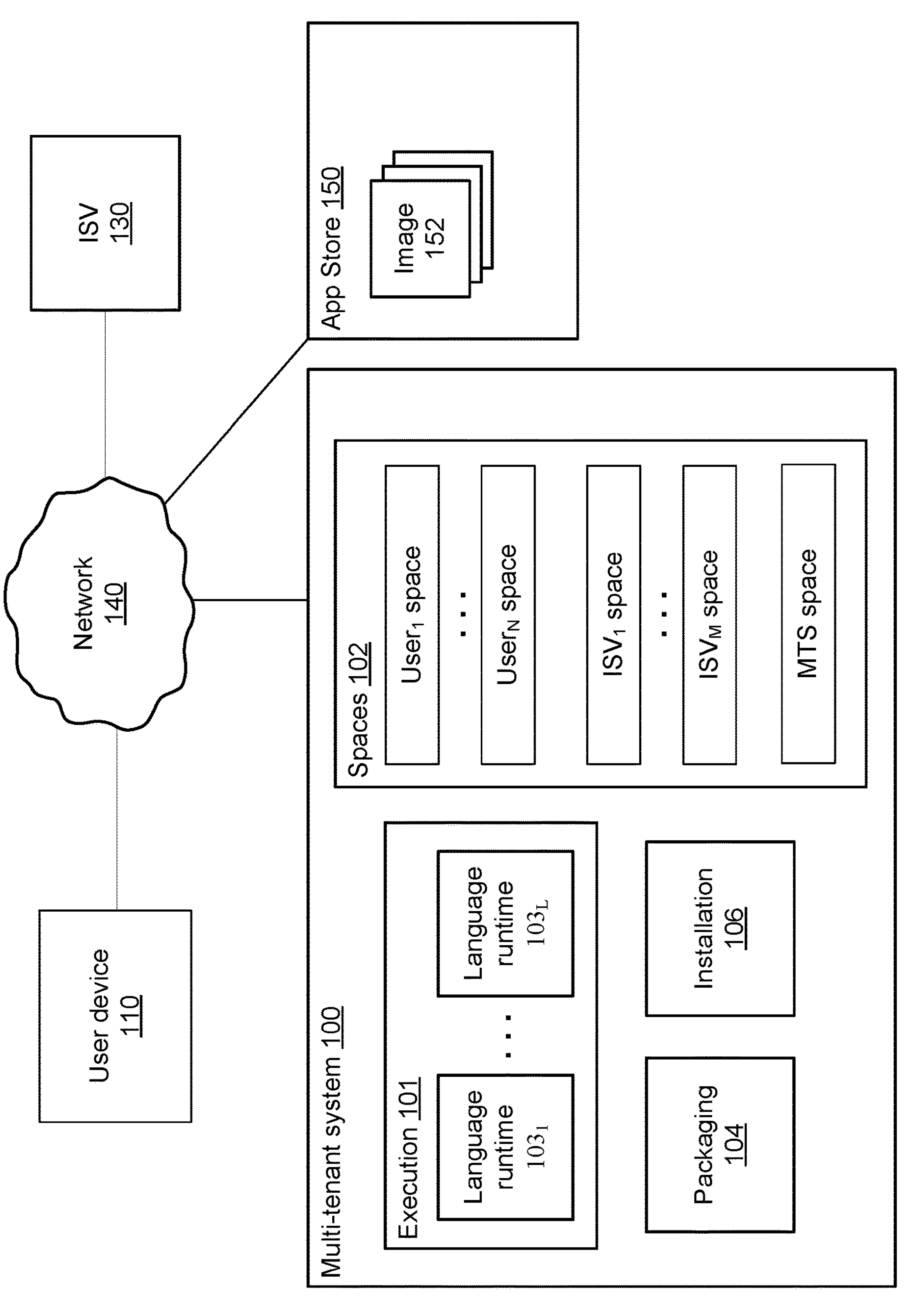
FIG. 1 illustrates an environment in which an MTS serves as the platform for software usage by users, according to some embodiments.

FIG. 1 illustrates an environment in which an MTS serves as the platform for software usage by users, according to some embodiments. Some of the software executed on the MTS 100 is created by one or more ISVs 130, and run by users via their user devices 110. The software to be run may be stored as an image 152 in an app store 150, which may be part of the MTS 100, or administered separately.

The network 140 may be any suitable communications network for data transmission. In an embodiment such as that illustrated in FIG. 1, the network 140 uses standard communications technologies and/or protocols and can include the Internet. In another embodiment, the entities use custom and/or dedicated data communications technologies.

The MTS 100 has an execution subsystem 101 with a set of language runtimes 103 corresponding to a set of languages supported by the MTS 100, such as Apex™, Java™, JavaScript™, C#™, and the like. The MTS 100 additionally has a set of spaces 102, which are logical portions of the MTS that the owners of those spaces can use to perform operations. The spaces 102 include a set of user spaces for the various users of the organizations that have registered as tenants of the MTS 100, and a set of ISV spaces for the ISVs that have likewise registered as tenants, as well as a space reserved for the MTS itself. The MTS 100 also has a packaging module 104 for packaging software into a form executable on the MTS, and an installation module 106 that installs the packaged software onto the MTS. The execution is elastic and scalable, so that the software being executed can be provided as many computing resources (processing, memory, storage, etc.) as are required for its computation.

Software, such as that of the various ISVs 130, can be made available to users of the MTS in different manners. As a first example, software of an ISV 130 may be installed within a user space belonging to one of the organizations that has registered as a tenant of the MTS 100, and users of that organization may then execute the software within that user space. Such an installation inherently provides isolation of the use of the software used by one customer organization from the use of the software by other customer organizations, since each organization has its own copy of the software and that copy of the software runs within the user space of that organization. On the other hand, such installations tend to require additional configuration and maintenance, since the ISV 130 selling the software may need to customize the software environment for each customer organization that buys the software. In some embodiments, the MTS 100 prevents the users of the organization from accessing the code of the software, permitting only the ability to execute the code.

As a second example, software of an ISV 130 may be installed within the ISV space of that ISV within the spaces 102 of the MTS 100, and then run by customer organizations within that ISV space. This type of installation advantageously requires only a single installation (within the ISV space), rather than one installation per customer organization, which simplifies installation and subsequent maintenance. On the other hand, depending on the implementation such an installation may not provide inter-organization isolation unless the ISV's software has itself been explicitly designed to provide such isolation, which potentially exposes the data of one organization to other organizations that use that same software within the ISV space. In this type of installation, the system provides the ISV 130 the option of specifying specific geographic regions in which the software will be deployed and/or regions in which the software will not be deployed.

As a third example, software of an ISV 130 may be installed within the MTS space of the MTS 100 itself within the spaces 102. Mechanisms of the MTS 100 then provide inter-organization isolation for the software, such as by executing the software within its own process container or other software module.

Figure 2:
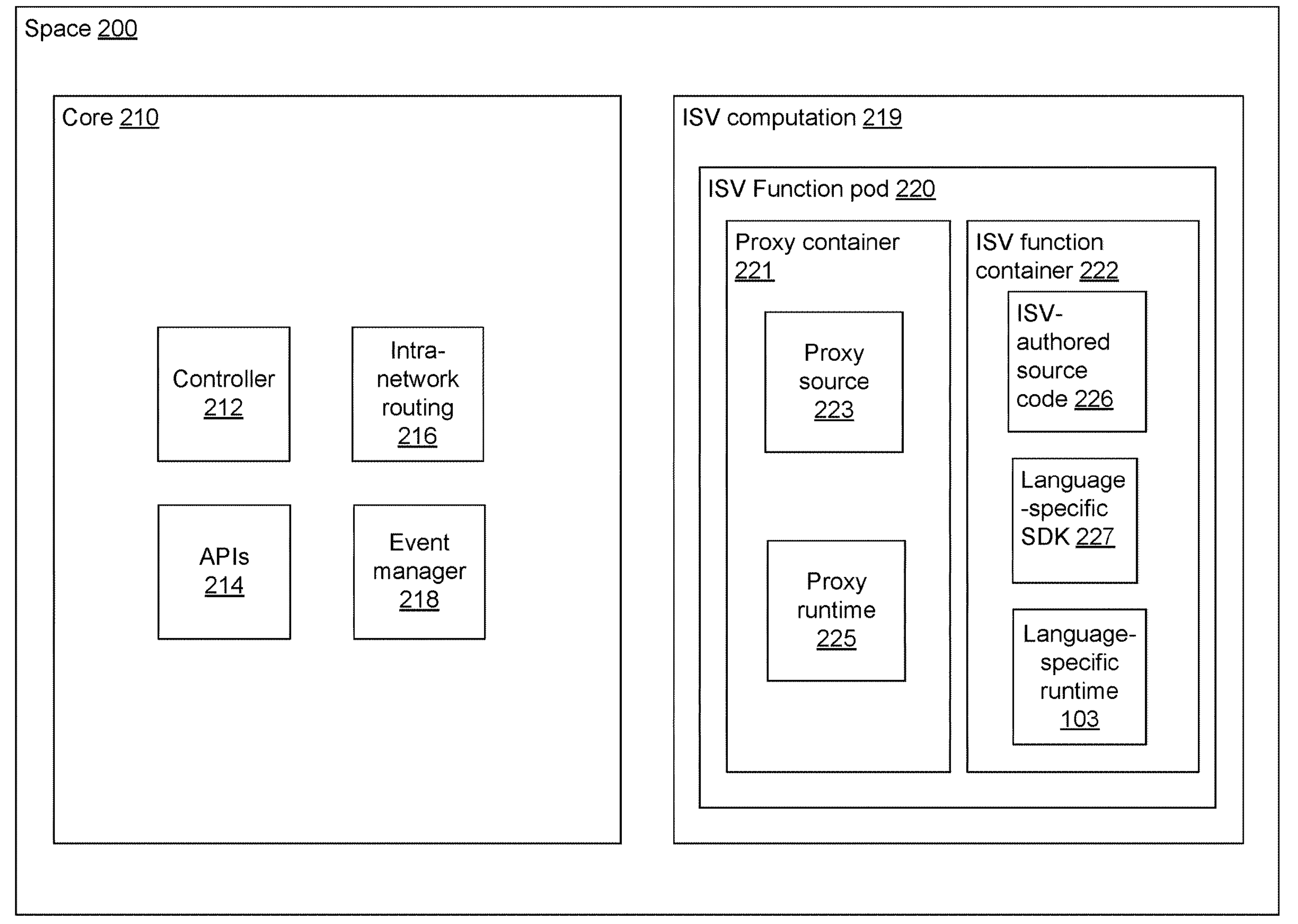
FIG. 2 illustrates a simplified view of components of one of the spaces of FIG. 1, according to some embodiments.

FIG. 2 illustrates a simplified view of components of one of the spaces 200 within spaces 102 of FIG. 1, according to some embodiments. The space 200 includes a core subspace 210 for code and other content originating from the MTS 100 itself, and a third-party ISV computation subspace 219 for code (herein referred to as a "function") and other content originating from an ISV 130. The core subspace 210 has an event manager 218 that responds to events taking place within the MTS 100 for the owner of that particular space 102, an application programming interface (APIs) 214 for calling functionality provided by the MTS 100, an intra-network routing module 216 for sending messages between the core subspace 210 and the ISV computation subspace 219 based on publication of events in the core subspace and subscription to those events in the computation subspace, and a controller 212 that provisions components in the spaces 200 and ensures that the components are properly connected and functioning.

The ISV computation subspace 219 includes an ISV function pod 220 for each function. The ISV function pod 220 includes a proxy container 221 that receives requests for the corresponding function and returns the outputs of function invocation. The proxy container 221 includes a proxy source 223 that handles function incoming requests, validates the request, mints access tokens, monitors function container health, emits metrics, and handles asynchronous request responses back to the core. The proxy container also includes a proxy runtime 225 that is the foundation for the proxy source 223, ensuring that the proxy source is operating properly. The ISV function pod 220 also includes an ISV function container 222 that handles execution of the function. Specifically, the ISV function container 222 includes ISV-authored source code 226 (the code written by the ISV), a language specific SDK 227 written in the same language as the source code 226 and that calls the APIs 214 using that language, and a language-specific runtime 103 that executes the source code 226. The containers 221, 222 may be implemented using container technology such as a Docker™ container.

At runtime, when a particular function is invoked, the core subspace 210 calls the intra-network routing module 216, which in turn makes a request (e.g., via HTTP) to the proxy container 221 in the function pod 220. The proxy 221 calls the function 226 running in the container 222, which in turn makes any needed calls to the functionality of the MTS 100 via use of the SDK 227 to access the APIs 214. Any output of the function 226 is delivered back (e.g., via the proxy 221) to the function's caller.

Figure 3:
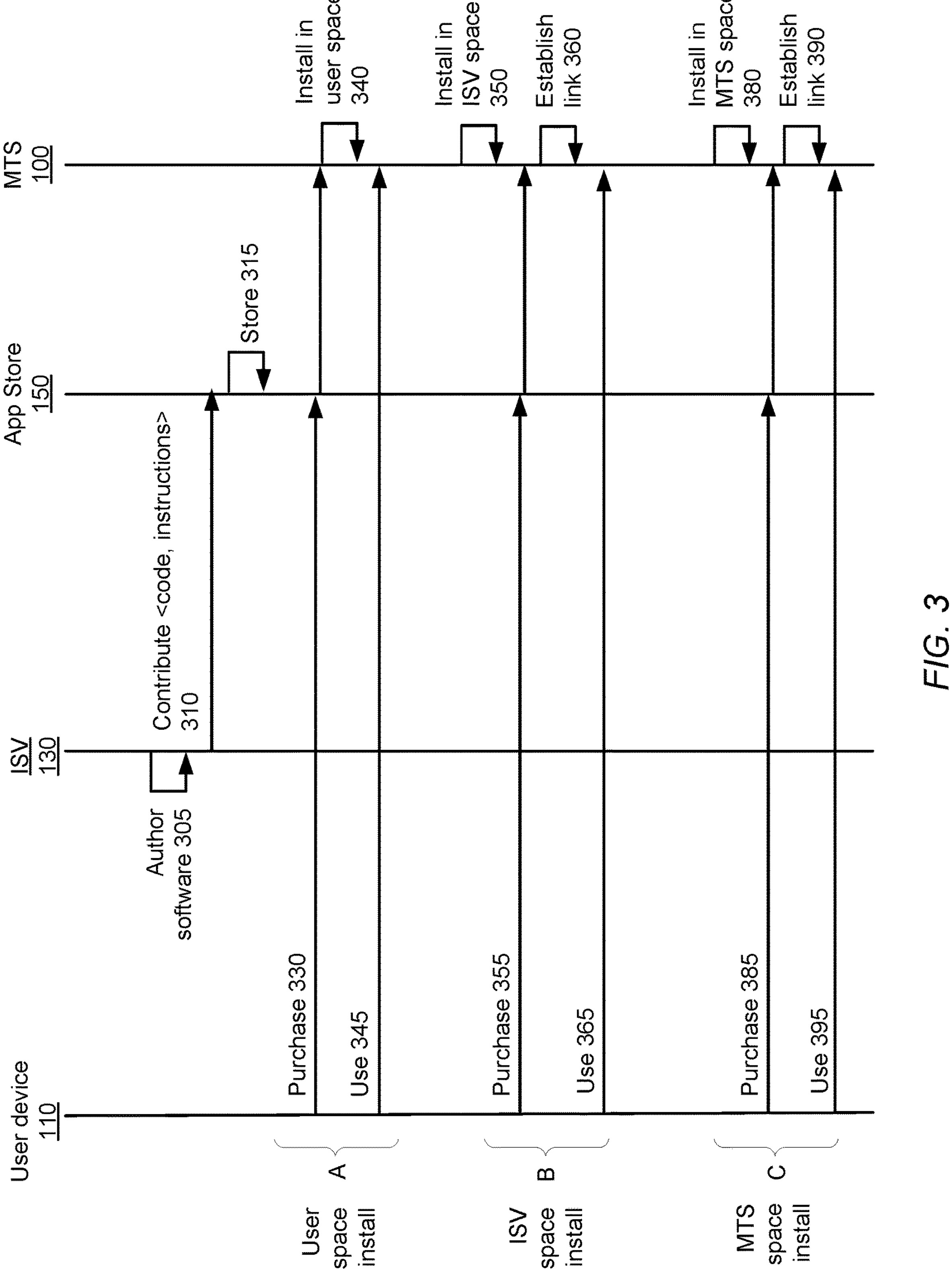
FIG. 3 is a sequence diagram illustrating the interactions of the various components of FIG. 1 when installing and running software of an ISV in various approaches, according to some embodiments.

FIG. 3 is a sequence diagram illustrating the interactions of the various components of FIG. 1 when installing and running software of an ISV 130 in various approaches, according to some embodiments. An ISV 130 authors 305 software for use on the MTS 100, and contributes 310 that code to the app store 150 of the MTS 100. The ISV 130 additionally submits instructions along with the code, the instruction specifying constituting a simple selection of the way in which the software should be installed (e.g., in a space 102 of the user, or of the ISV itself, or of the MTS). The code is stored in the app store 150, where it is made available to users of the MTS. The remaining steps of FIG. 3 illustrate three different approaches to installation and execution of the code, chosen based on an instruction provided by the user of the ISV 130 submitting the code.

In one approach, a user (such an as administrator of an organization using the MTS 100), via the user device 110, purchases 330 the software via the app store 150. The purchasing user provides an instruction that the software is to be executed from the user space of the user's organization, and the MTS accordingly installs 340 the software in user space. At a later point, a user device 110 (e.g., that of another user of the organization that purchased the software) requests 345 execution of the software. The MTS runs the software within the user space for the organization and returns any results to the user device 110.

In another approach, the ISV 130 wishes the software to be executed within the ISV's own space on the MTS. (This is appropriate, for example, where the ISV 130 designed the software to provide proper inter-organization isolation, so that data of one organization does not somehow become accessible to a different organization.) Accordingly, the ISV 130 provides instructions specifying installation of the software within the ISV's own space, and the MTS accordingly installs 360 the software within the space of the ISV 130 on the MTS 100. Upon purchase 355 of the software by a user of an organization, the MTS 100 also establishes 360 a link to the installed software, setting up a trusted connection between the core subspace 210 and the ISV computation subspace 219, so that calls to the software from user devices 110 will cause it to run from within the ISV space. At some later point, a user uses 365 a user device 110 to execute the software. The MTS 100 accordingly runs the software within the ISV space (e.g., after first verifying that the user's organization has purchased rights to use the software) and returns any results to the user device 110.

In yet another approach, the ISV 130 wishes the software to be executed within the MTS's own space on the MTS 100. (This is appropriate, for example, when the software does not itself provide inter-organization isolation, and so the ISV 130 wishes for the MTS 100 to provide that isolation.) Accordingly, the ISV 130 provides instructions specifying installation of the software within the MTS's own space, and the MTS accordingly installs 380 the software within the MTS's own space. Upon purchase 385 of the software by a user of an organization, the MTS 100 also establishes 390 a link to the installed software so that calls to it from user devices 110 of the organization will cause it to run from within the MTS space. At some later point, a user of the organization uses 395 a user device 110 to execute the software. The MTS 100 accordingly runs the software within the MTS space and returns any results to the user device 110.

Figure 4:
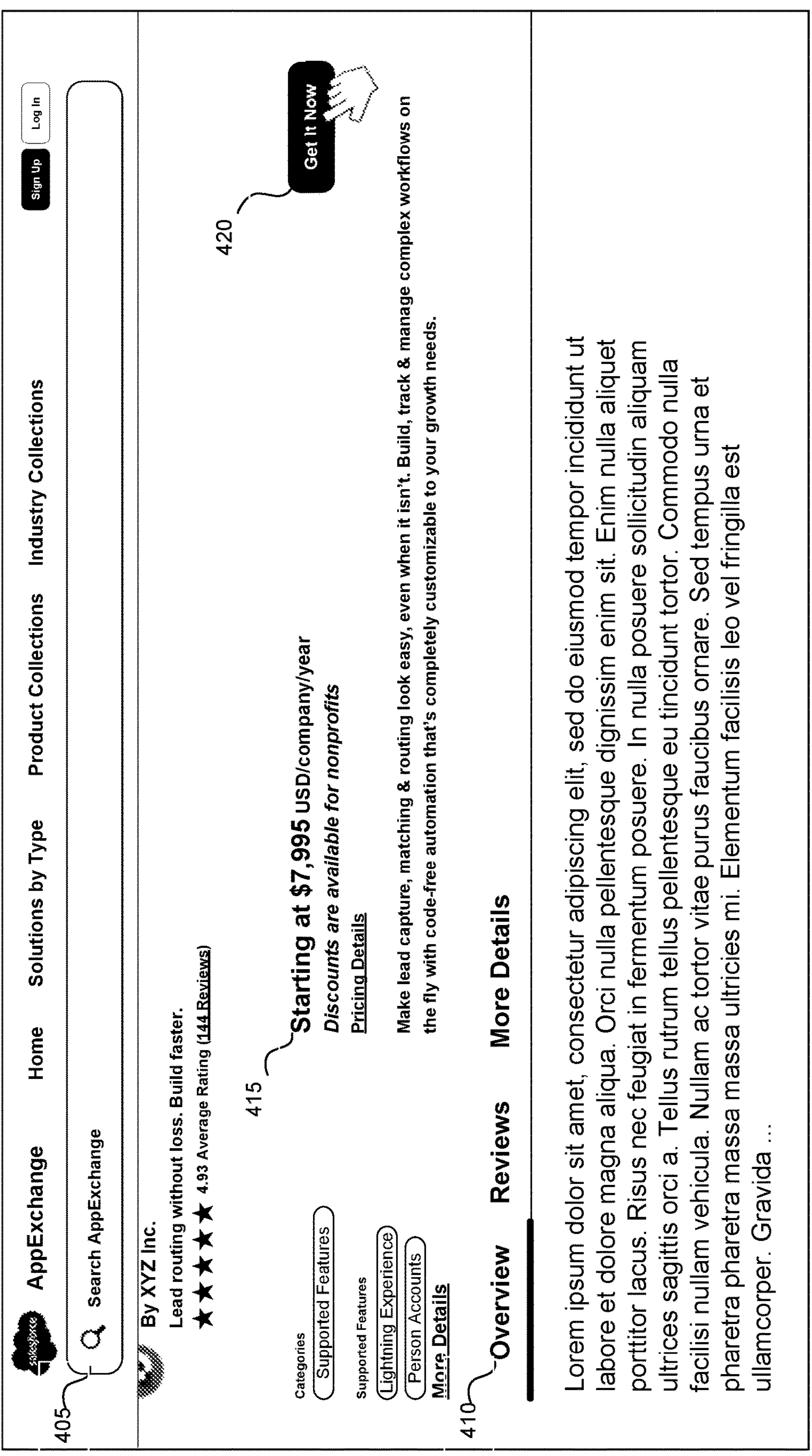
FIG. 4 illustrates an example user interface provided by an app store to enable a user to locate and purchase software—such as software created by an ISV—for use on the MTS of FIG. 1, according to some embodiments.

FIG. 4 illustrates an example user interface provided by the app store 150 to enable a user to locate and purchase software—such as software created by an ISV 130—for use on the MTS 100, according to some embodiments. The user can use area 405 to search the app store 150, e.g., by name of the software. Area 410 provides information about the currently-viewed software, and area 415 provides details about pricing. Clicking on or otherwise selecting a user interface element (e.g., the "Get it now" button 420) leads to the user obtaining the ability to use the selected software on the MTS 100, regardless of the manner in which the software has been deployed to the MTS (e.g., within user spaces, an ISV space, or the MTS's space). That is, the MTS 100 will handle the details of properly configuring the software in whichever manner the ISV 130 specified, such as within the user space, or the ISV space. (In the example of FIG. 3, using the "Get it now" button 420 corresponds to the purchase steps 330, 355, and 385.) Thus, the user is spared the need to differently configure the software based on the way that the ISV 130 has chosen to make that software available on the MTS 100.

Figure 5:
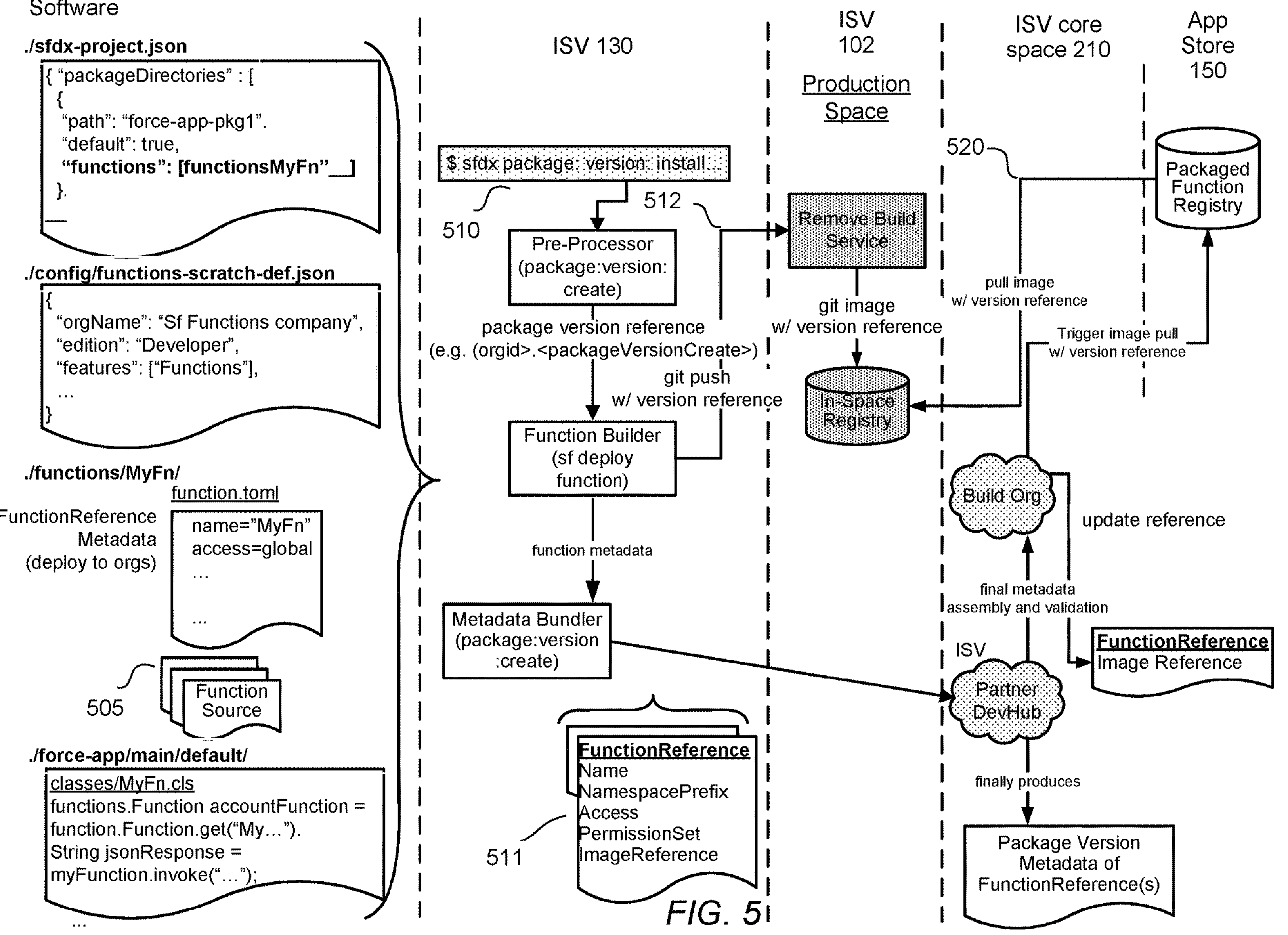
FIG. 5 illustrates steps performed by the packaging module when packaging ISV software for use within the MTS of FIG. 1, according to some embodiments.

FIG. 5 illustrates steps performed by the packaging module 104 when packaging ISV software for use within the MTS 100, according to some embodiments. The software code ("function") 505 and other project files are input to a packaging step 510, resulting in metadata 511 describing the function (e.g., for use within the app store 150 when displaying the software to users), as well as a push 512 of the function source files to a remote build service within a production space of the ISV 130, resulting in an image of the function. Within the ISV's core space 210 the function metadata is assembled and validated, creating a reference to the function, which is combined with the image of the function stored in the core. The reference to the function enables integration of the function within other functionality of the MTS 100—such as UI wizards, integrated development environments (IDEs), and language constructs—and also is used to validate existence of the function and accessibility of the function to invoking components.

Figure 6:
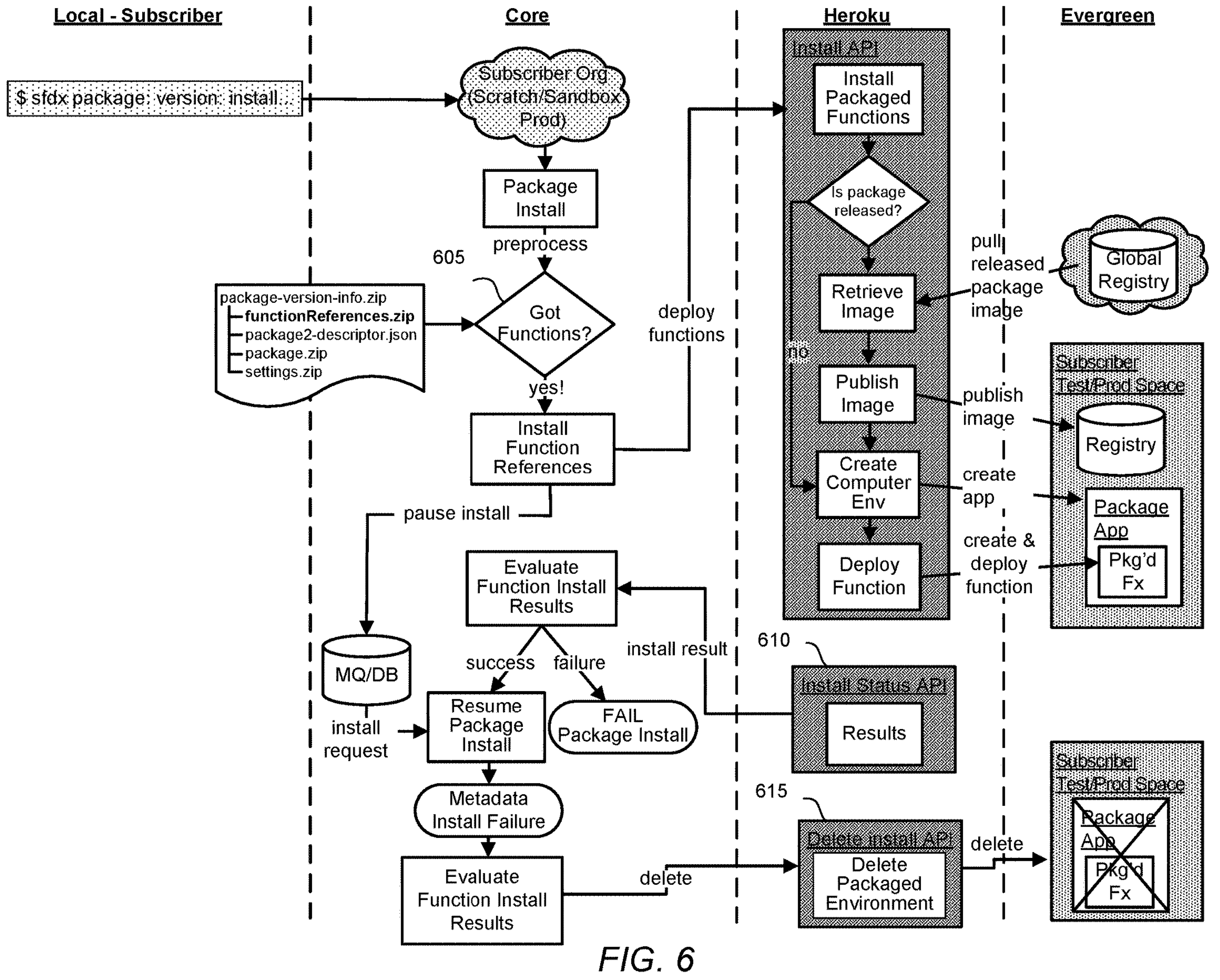
FIG. 6 illustrates steps performed by installation module of FIG. 1 when installing the software ("function") within a space for use by users, according to some embodiments.

FIG. 6 illustrates steps performed by installation module 106 of the MTS 100 when installing the software ("function") within a space 102 for use by users, according to some embodiments. The installation process determines 605 whether the package contains functions; if so, it installs the function references in the core so that the functions can be looked up by name, and also makes the function available by publishing the application image and creating a virtual computing environment (e.g., a container) in which the function can run. In some embodiments, different types of functionality—such as procedural code, declarative web components, declarative flows, and the like—can be packaged as a function.

The MTS 100 ensures that that "ACID" properties are satisfied by the installation process, rolling back the installation if some portions thereof fail. To do so, it employs an install status API 610 to evaluate whether either the function package or metadata installation processes had errors; if so, a "destroy install" API 615 to delete any data from portions of the attempted installation that took place, remove the image of the function from the local registry, and delete the computation environment.

Figure 7:
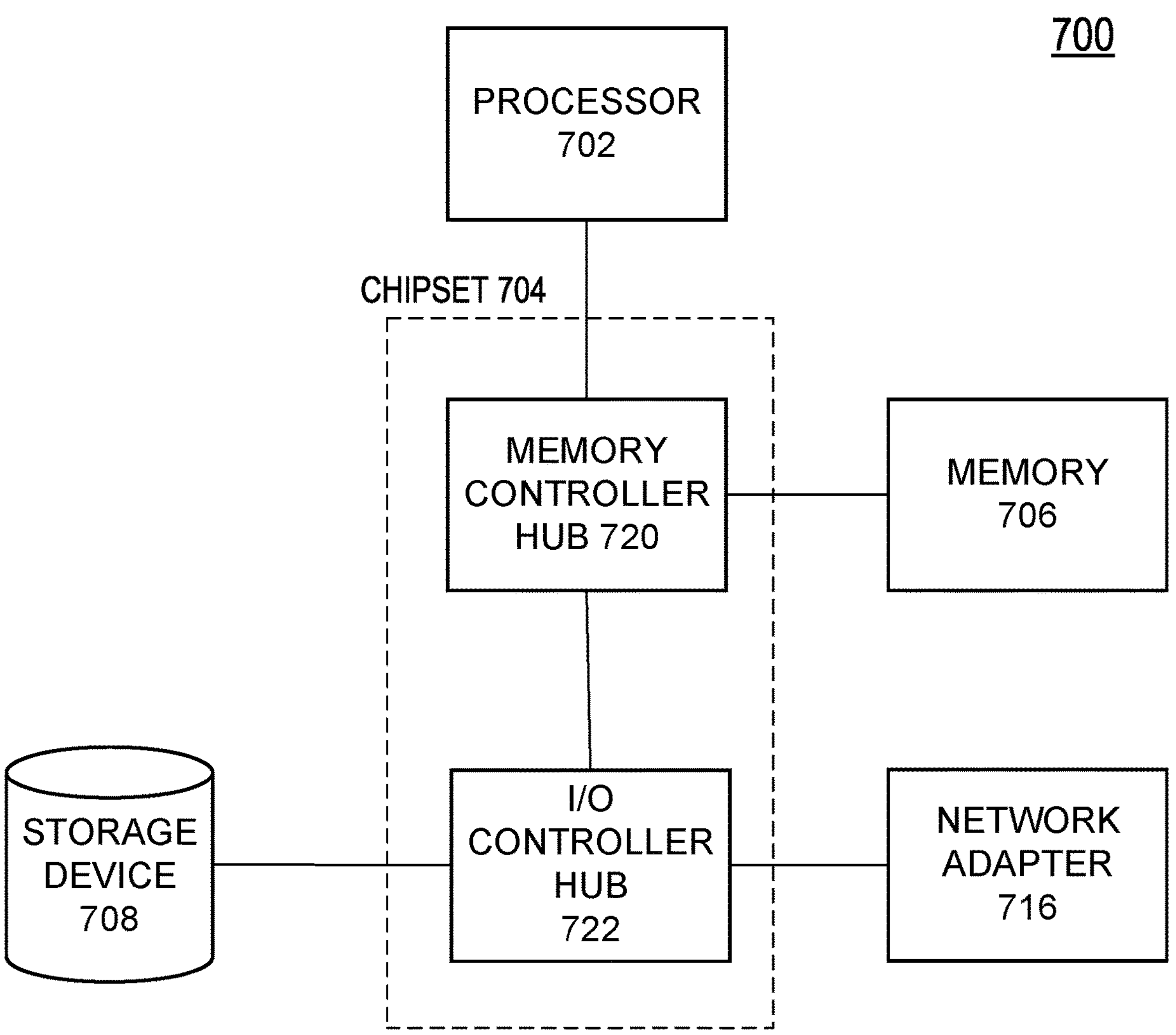
FIG. 7 is a high-level block diagram illustrating physical components of a computer used as part or all of MTS from FIG. 1, according to one embodiment.

FIG. 7 is a high-level block diagram illustrating physical components of a computer 700 used as part or all of MTS 100 from FIG. 1, according to one embodiment. Illustrated are at least one processor 702 coupled to a chipset 704. Also coupled to the chipset 704 are a memory 706, a storage device 708, and a network adapter 716. In one embodiment, the functionality of the chipset 704 is provided by a memory controller hub 720 and an I/O controller hub 722. In another embodiment, the memory 706 is coupled directly to the processor 702 instead of the chipset 704.

The storage device 708 is any non-transitory computer-readable storage medium, such as a hard drive, compact disk read-only memory (CD-ROM), DVD, or a solid-state memory device. The memory 706 holds instructions and data used by the processor 702. The network adapter 716 couples the computer 700 to a local or wide area network.

As is known in the art, an MTS 700 can have different and/or other components than those shown in FIG. 7. In addition, the computer 700 can lack certain illustrated components. Moreover, the storage device 708 can be local and/or remote from the computer 700 (such as embodied within a storage area network (SAN)).

As is known in the art, the computer 700 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 708, loaded into the memory 706, and executed by the processor 702.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Other Considerations

The processes described above can be implemented on different types of computer systems, including multi-tenant computer systems (of which multi-cloud systems are one type). In a multi-tenant computer system, multiple tenants share the use of a computer system, but without access or knowledge to each other's data or activities. Each tenant may be an enterprise. As an example, one tenant might be a company that employs a sales force where each salesperson uses a client device to manage their sales process. Thus, a user might maintain contact data, leads data, customer follow-up data, performance data, goals and progress data, etc., all applicable to that user's personal sales process.

In one embodiment, a multi-tenant computer system implements a web-based customer relationship management (CRM) system. For example, the system includes application servers configured to implement and execute CRM software applications as well as provide related data, code, forms, webpages and other information to and from client devices and to store to, and retrieve from, a database system related data, objects, and webpage content. The capabilities described above are part of the CRM software applications. The activity being analyzed may be past, current and future sales transactions.

With a multi-tenant system, data for multiple tenants may be stored in the same physical database. However, tenant data typically is arranged so that data of one tenant is kept logically separate from that of other tenants so that one tenant does not have access to another tenant's data, unless such data is expressly shared. A tenant metadata store stores information that allows identification of data for different tenants, for example, using identifiers that uniquely identify each tenant.

In certain embodiments, the system implements applications other than, or in addition to, a CRM application. For example, the system may provide tenant access to multiple hosted (standard and custom) applications, including a CRM application. According to one embodiment, the system is configured to provide webpages, forms, applications, data and media content to client devices to support the access by client devices as tenants of system. As such, the system provides security mechanisms to keep each tenant's data separate unless the data is shared.

A multi-tenant system may implement security protocols that keep data, applications, and application use separate for different tenants. In addition to user-specific data and tenant-specific data, the system may maintain system level data usable by multiple tenants or other data. Such system level data may include industry reports, news, postings, and the like that are sharable among tenants.

The processes described above may also be implemented on other types of systems, for example client-server systems, mobile technology and devices, mobile networks, wearable devices, tablets, PCs, software-as-a-service, etc.

Alternate embodiments are implemented in computer hardware, firmware, software, and/or combinations thereof. Implementations can be implemented in a computer program product tangibly embodied in a machine-readable storage device for execution by a programmable processor; and method steps can be performed by a programmable processor executing a program of instructions to perform functions by operating on input data and generating output. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random-access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

Although the detailed description contains many specifics, these should not be construed as limiting the scope of this disclosure but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of patent rights should be determined by the appended claims and their legal equivalents.

What is claimed is:

1. A computer-implemented method comprising:

receiving, by an app store of a multi-tenant system (MTS), first code, second code, and third code for one or more software authored by one or more independent software vendors (ISVs) registered with the MTS, and a plurality of selections by the one or more ISV in a graphical user interface (GUI), the plurality of selections specifying a plurality of instructions for making the first code, second code, and third code for the one or more software available to customers in a customer organization installation, an ISV installation, and an MTS installation;

storing a plurality of entries for the first code, second code, and third code in the app store;

receiving a plurality of requests from the app store for the first code, second code, and third code from a customer;

reviewing the respective instruction for making the first code, second code, and third code available to determine which of the customer organization installation, the ISV installation, and the MTS installation was selected;

for the first code where the instruction specifies the customer organization installation:

installing the first code within a space of the MTS belonging to the customer;

receiving a runtime request of the customer to use functionality of the first code; and executing first code for the functionality within the space of the MTS belonging to the customer;

for the second code where the instruction specifies the ISV installation:

establishing a link to a service on a system of the ISV in which the second code is embodied;

receiving a runtime request of a customer to use functionality of the second code; and redirecting the runtime request via the link to the service on the system of the ISV; and for the third code where the instruction specifies the MTS installation:

installing the third code within a space of the MTS belonging to the MTS itself;

executing third code for the functionality within the space of the MTS belonging to the MTS.

2. The computer-implemented method of claim 1, further comprising:

providing a customer graphical user interface displaying information about the software and comprising a user interface element indicating that a customer wishes to obtain the software for use with the MTS; and in response to selection of the user interface element, configuring the software to run on the MTS according to the selection by the ISV.

3. The computer-implemented method of claim 1, further comprising packaging the software for use on the MTS, the packaging inputting the software and outputting software metadata, a software image, and a software reference.

4. The computer-implemented method of claim 1, wherein installing the code within a space of the MTS belonging to the customer comprises creating a container for the first customer in which to run the code.

5. The computer-implemented method of claim 1, wherein installing the first code within a space of the MTS belonging to the customer permits the first customer to execute the first code but not to view the first code.

6. The computer-implemented method of claim 1, wherein:

for the second code where the instruction specifies the ISV installation, the second code is configured to provide proper configured inter-organization isolation, and for the third code where the instruction specifies the MTS installation, the third code does not itself provide inter-organization isolation.

7. A non-transitory computer-readable storage medium storing instructions that when executed by a computer processor perform actions comprising:

receiving, by an app store of a multi-tenant system (MTS), first code, second code, and third code for one or more software authored by one or more independent software vendors (ISVs) registered with the MTS, and a plurality of selections by the one or more ISV in a graphical user interface (GUI), the plurality of selections specifying a plurality of instructions for making the first code, second code, and third code for the one or more software available to customers in a customer organization installation, an ISV installation, and an MTS installation;

storing a plurality of entries for the first code, second code, and third code in the app store;

receiving a plurality of requests from the app store for the first code, second code, and third code from a customer;

reviewing the respective instruction for making the first code, second code, and third code available to determine which of the customer organization installation, the ISV installation, and the MTS installation was selected;

for the first code where the instruction specifies the customer organization installation:

installing the first code within a space of the MTS belonging to the customer;

receiving a runtime request of the customer to use functionality of the first code; and executing first code for the functionality within the space of the MTS belonging to the customer;

for the second code where the instruction specifies the ISV installation:

establishing a link to a service on a system of the ISV in which the second code is embodied;

receiving a runtime request of a customer to use functionality of the second code; and redirecting the runtime request via the link to the service on the system of the ISV; and for the third code where the instruction specifies the MTS installation:

installing the third code within a space of the MTS belonging to the MTS itself;

executing third code for the functionality within the space of the MTS belonging to the MTS.

8. The non-transitory computer-readable storage medium of claim 7, the actions further comprising:

providing a customer graphical user interface displaying information about the software and comprising a user interface element indicating that a customer wishes to obtain the software for use with the MTS; and in response to selection of the user interface element, configuring the software to run on the MTS according to the selection by the ISV.

9. The non-transitory computer-readable storage medium of claim 7, the actions further comprising packaging the software for use on the MTS, the packaging inputting the software and outputting software metadata, a software image, and a software reference.

10. The non-transitory computer-readable storage medium of claim 7, wherein installing the code within a space of the MTS belonging to the customer comprises creating a container for the first customer in which to run the code.

11. The non-transitory computer-readable storage medium of claim 7, wherein installing the first code within a space of the MTS belonging to the customer permits the first customer to execute the first code but not to view the first code.

12. The non-transitory computer-readable storage medium of claim 7, wherein:

for the second code where the instruction specifies the ISV installation, the second code is configured to provide proper configured inter-organization isolation, and for the third code where the instruction specifies the MTS installation, the third code does not itself provide inter-organization isolation.

13. A multi-tenant system (MTS) comprising:

a computer processor; and a non-transitory computer-readable storage medium storing instructions that when executed by the computer processor perform actions comprising:

receiving, by an app store of the multi-tenant system (MTS), first code, second code, and third code for one or more software authored by one or more independent software vendors (ISVs) registered with the MTS, and a plurality of selections by the one or more ISV in a graphical user interface (GUI), the plurality of selections specifying a plurality of instructions for making the first code, second code, and third code for the one or more software available to customers in a customer organization installation, an ISV installation, and an MTS installation;

storing a plurality of entries for the first code, second code, and third code in the app store;

receiving a plurality of requests from the app store for the first code, second code, and third code from a customer;

reviewing the respective instruction for making the first code, second code, and third code available to determine which of the customer organization installation, the ISV installation, and the MTS installation was selected;

for the first code where the instruction specifies the customer organization installation:

installing the first code within a space of the MTS belonging to the customer;

receiving a runtime request of the customer to use functionality of the first code; and executing first code for the functionality within the space of the MTS belonging to the customer;

for the second code where the instruction specifies the ISV installation:

establishing a link to a service on a system of the ISV in which the second code is embodied;

receiving a runtime request of a customer to use functionality of the second code; and redirecting the runtime request via the link to the service on the system of the ISV; and for the third code where the instruction specifies the MTS installation:

installing the third code within a space of the MTS belonging to the MTS itself;

executing third code for the functionality within the space of the MTS belonging to the MTS.

14. The multi-tenant system of claim 13, the actions further comprising:

providing a customer graphical user interface displaying information about the software and comprising a user interface element indicating that a customer wishes to obtain the software for use with the MTS; and in response to selection of the user interface element, configuring the software to run on the MTS according to the selection by the ISV.

15. The multi-tenant system of claim 13, the actions further comprising packaging the software for use on the MTS, the packaging inputting the software and outputting software metadata, a software image, and a software reference.

16. The multi-tenant system of claim 13, wherein installing the code within a space of the MTS belonging to the first customer comprises creating a container for the customer in which to run the code.

17. The multi-tenant system of claim 13, wherein installing the first code within a space of the MTS belonging to the customer permits the first customer to execute the first code but not to view the first code.

18. The multi-tenant system of claim 13, wherein:

for the second code where the instruction specifies the ISV installation, the second code is configured to provide proper configured inter-organization isolation, and for the third code where the instruction specifies the MTS installation, the third code does not itself provide inter-organization isolation.

* * * * *